Figure 1:
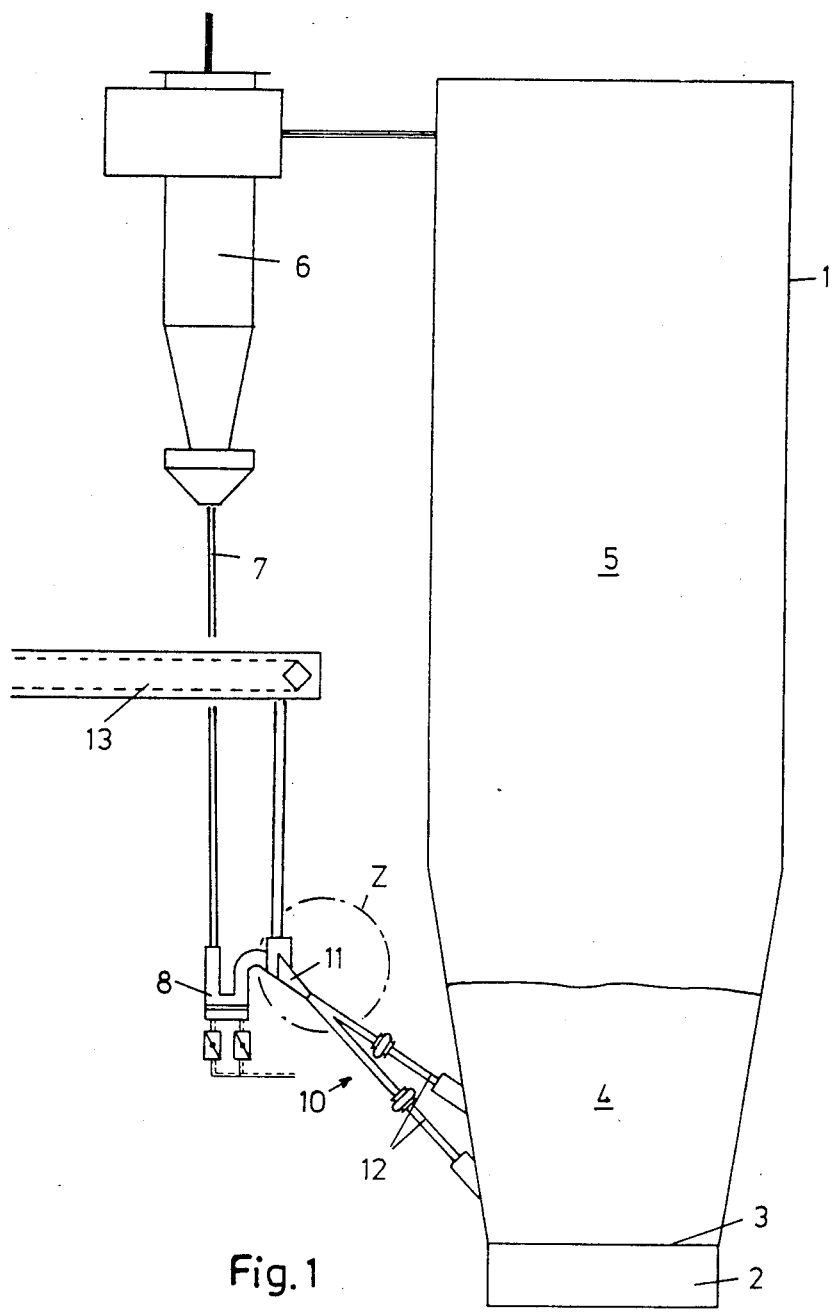

United States Patent [19]

Buchmüller et al.

[11] Patent Number: 4,917,025

[45] Date of Patent: Apr. 17, 1990

[54] FLUIDIZED-BED FURNACE THAT RECIRCULATES SOLIDS

[75] Inventors: Horst Buchmüller, Hünxe; Gerd Morawski, Essen, both of Fed. Rep. of Germany

[73] Assignee: Deutsche Babcock Werke Aktiengesellschaft, Oberhausen, Fed. Rep. of Germany

[21] Appl. No.: 419,771

[22] Filed: Oct. 11, 1989

[30] Foreign Application Priority Data

Oct. 15, 1988 [DE] Fed. Rep. of Germany ....... 3835172

[51] Int. Cl.⁴ .................................................. F23G 7/00
[52] U.S. Cl. .................................... 110/245; 122/4 D; 422/139; 165/104.16
[58] Field of Search ........................ 110/245, 347, 263; 122/4 D; 165/104.16; 422/139; 34/57 A; 431/7

[56] References Cited

U.S. PATENT DOCUMENTS

| | | |
|---|---|---|
| 4,145,581 | 5/1979 | Nack et al. ............................ 110/245 |
| 4,419,965 | 12/1983 | Garcia-Mallol et al. ............ 110/245 |
| 4,473,033 | 9/1984 | Strohmeyer, Jr. .................... 110/245 |
| 4,598,653 | 7/1986 | Stringfellow et al. ............... 110/263 |
| 4,761,131 | 8/1988 | Abdulally ............................. 110/263 |
| 4,788,919 | 12/1988 | Holm et al. .......................... 122/4 D |
| 4,796,546 | 1/1989 | Herstad et al. ....................... 110/263 |
| 4,813,381 | 3/1989 | Kullendorff et al. ................ 110/245 |
| 4,823,739 | 4/1989 | Marcellin ............................. 122/4 D |

Primary Examiner—Edward G. Favors
Assistant Examiner—Denise L. Ferensic
Attorney, Agent, or Firm—Max Fogiel

[57] ABSTRACT

A fluidized-bed furnace recirculates solids by way of one or more cyclone precipitators (6), the solids outlet of which communicates with the fluidized bed (4) by way of a trap (8) and a directly downstream chute (10). The coal intake opens into the chute. The outlet (9) from the trap (8) communicates with the chute (10) through a transitional section (11). The transitional section tapers out from the outlet from the trap and then in to the chute. The coal intake is above the wider section of the transitional section.

3 Claims, 2 Drawing Sheets

FLUIDIZED-BED FURNACE THAT RECIRCULATES SOLIDS

The invention concerns a fluidized-bed furnace that recirculates solids as recited in the preamble to claim 1.

The solids precipitated from the flue gas in one furnace with a low-expanded stationary fluidized bed (Technische Mitteilungen 1984, 298–300) can be mechanically or pneumatically recirculated along with or separate from the coal. One advantage of supplying the coal mechanically through risers or chutes rather than pneumatically is that the unprocessed coal only needs to be preliminarily broken up to a maximum particle size and not dried. Furthermore, no secondary air arrives in the furnace in the form of conveying air. When coal that has been preliminarily treated in this way is introduced mechanically, however, it tends to cake up on the horizontal walls of the conveying equipment and clog up the lines, especially when the solids are conveyed through the same equipment at an elevated temperature. This occurs in a fluidized-bed furnace wherein the solids precipitated out of the flue gas retain a temperature of 300° to 500° C. depending on the process.

The object of the present invention is to introduce unprocessed coal into a line that has hot solids flowing through it in such a way that the coal cannot cake up on the walls of the line.

This object is attained in accordance with the invention in a generic fluidized-bed furnace by the characteristics recited in the body of claim 1. An advantageous embodiment of the invention is recited in the subsidiary claims.

The design in accordance with the invention expands the flow of solids, which account for a multiple of the total volume of unprocessed coal. Since the coal contains moisture, it is added through a wide intake. It settles on the expanded flow of solids, which carries it into the fluidized bed. The coal does not come into contact with the walls of the chute or transitional section and can accordingly not cake up.

Figure 2:
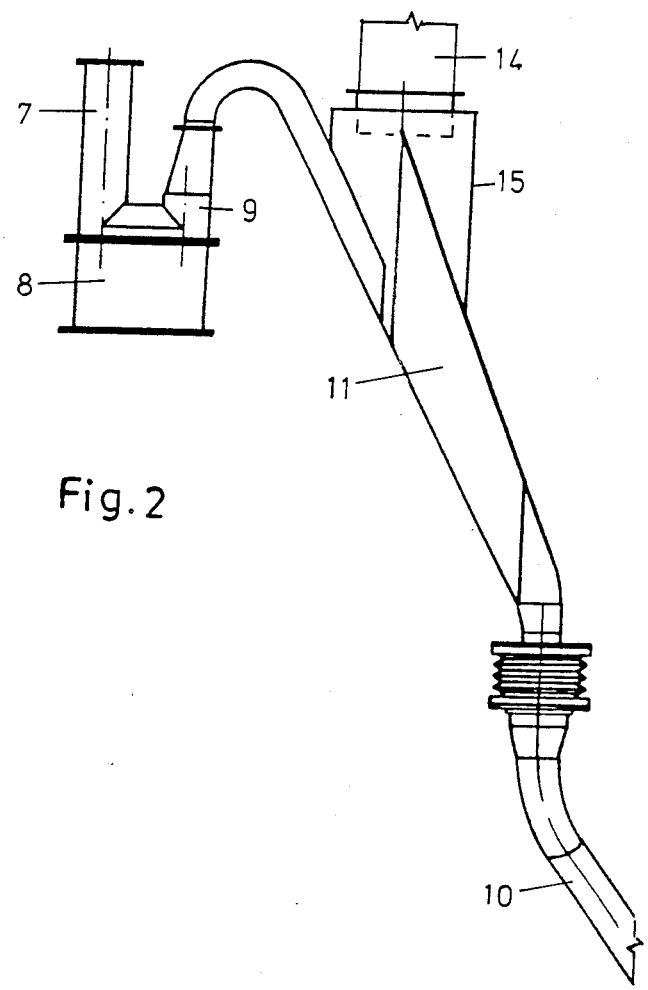
Figure 3:
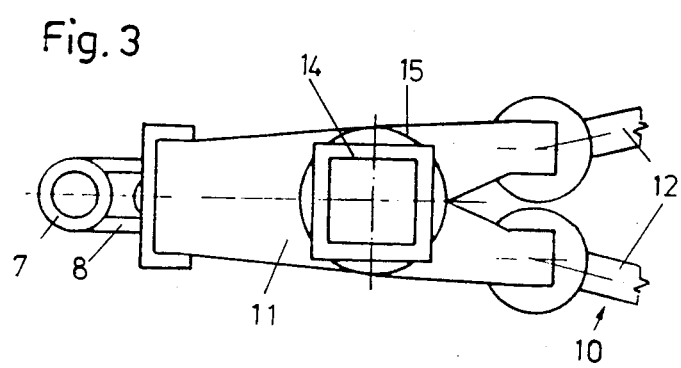

One embodiment of the invention will now be described with reference to the drawing, wherein FIG. 1 is a schematic illustration of a fluidized-bed furnace with intakes for solids and coal, FIG. 2 is a detail of the area Z in FIG. 1, and FIG. 3 is a top view of FIG. 2.

A furnace heats a steam generator, one boiler flue 1 of which is illustrated and can communicate with one or more additional flues. The walls of boiler flue 1 consist of pipes welded together gas-tight and operating as evaporators. The flue comprises, from bottom to top, an air box 2, a nozzle floor 3, a stationary, low-expanded fluidized bed 4, and an empty space 5. Fluidized bed 4 and empty space 5 constitute the furnace's combustion space. The rate of fluidization in the combustion space is 3 to 5 m/sec, which is high enough to extract particles of moderate size (approximately 0.5 mm) from fluidized bed 4. Above empty space 5 are convective surfaces. The temperature of the flue gas at the top of boiler flue 1 ranges between 300° and 500° C., depending on the application. The gas at this temperature arrives in cyclone precipitators 6, only one of which is illustrated in FIG. 1. The precipitators separate the solids entrained in the gas from the gas, return the solids to fluidized bed 4, and cool the bed.

Communicating with the solids outlet from cyclone precipitator 6 is a riser 7 that opens into the top of a trap 8. The precipitated solids accumulate in trap 8 and create a seal. Air or another gas is supplied to trap 8 to fluidize the solids inside it. The solids, which now behave like a fluid, emerge from trap 8 through outlet 9 and arrive in a chute 10.

Chute 10 communicates with the outlet 9 from trap 8 by way of a transitional section 11. Transitional section 11 initially tapers out from trap 8, as will be evident from FIG. 3, and then in to chute 10. Chute 10 can, downstream of transitional sectional 11, be divided into several subsidiary sections 12 that enter fluidized bed 4 separately.

The unprocessed and optionally moist coal employed as fuel is preliminarily milled to a maximum particle size of 8 to 12 mm and added by way of a distributor 13 to a shaft 14. The bottom of shaft 14 extends into a wide connector 15 that is tightly connected to shaft 14 and transitional section 11. Shaft 14 and connector 15, which supply the coal, are above the wider section of transitional section 11. The difference between the cross-sections of shaft 14 and connector 15 keeps the coal away from the vertical walls of the conveying equipment, preventing it from caking up there.

The solids leaving trap 8 arrive in transitional section 11, where they become distributed over its total floor. The coal can accordingly rest on the resulting layer of solids, which will carry it through chute 10 and into fluidized bed 4. The moist coal becomes covered with the solids and can accordingly not cake up on the floor of transitional section 11. The coal is also well mixed with the solids, and transitional section 11 accordingly acts like a blending chamber.

We claim:

1. A fluidized-bed furnace for recirculating solids through cyclone precipitator means comprising: a fluidized bed; at least one cyclone precipitator having a solids outlet; a trap and a directly down-stream chute, said solids outlet communicating with said fluidized bed through said trap and said downstream chute; a coal intake opening into said downstream chute; said trap having an outlet; a transitional section tapering out from said outlet of said trap and into said downstream chute, said outlet of said trap communicating with said downstream chute through said transitional section; said transitional section having a wider section, said coal intake being above said wider section of said transitional section.

2. A fluidized-bed furnace as defined in claim 1, wherein said downstream chute is downstream of said transitional section and is divided into a plurality of subsidiary sections.

3. A fluidized-bed furnace as defined in claim 1, including: a connector communicating with said transitional section; said coal intake comprising a shaft extending into said connector, said connector being wider than said shaft.

* * * * *